3,105,015
METHOD OF PRODUCING CITRIC ACID
Martin Torvald Tveit, Lund, Sweden, assignor to Svenska Sockerfabriks Aktiebolaget, Malmo, Sweden, a corporation of Sweden
No Drawing. Filed Oct. 31, 1960, Ser. No. 65,951
Claims priority, application Sweden Nov. 11, 1959
1 Claim. (Cl. 195—36)

The invention relates to improvements in a method of producing citric acid.

It has been proposed to produce citric acid by means of a submerged fermentation of diluted molasses while using mould fungi of the geni Aspergillus and Pencillium. In this process, the substratum has been inoculated by mycelium, i.e. spores developed separately in a solution of a type similar to the one used for the citric acid fermentation. It has been common to let the spores develop while shaking the solution mechanically so that mycelium threads or hyphae become felted and form small more or less spherical aggregates, so-called pellets. By inoculation with such pellets the fermentations could be carried out more uniformly and with more uniform yields than before.

It has also been proposed to carry out inoculation with non-agglomerated mycelium of *Aspergillus niger*, and after a certain period of fermentation the pH of the solution is reduced by adding an acid or an acid salt while agitating and aerating the solution simultaneously. The pH is said to be reduced to not less than 4.6 in solutions of beet sugar molasses, while corresponding limit values for solutions of cane sugar molasses and invert molasses are 3.8 and 3.3 respectively. After this reduction of pH, the fermentation is completed under continued agitation and aeration, and the mycelium is then developed into spherical units or aggregates, so-called pellets. The method is said to result in an increased formation of citric acid up to an amount of 70%, calculated on the amount of sugar used.

The methods previously known have generally yielded a certain amount of oxalic acid together with the citric acid, and therefore the crude acid obtained had to undergo a special purification.

According to the present invention, the sugar supplied is much better utilized (higher yield) and no oxalic acid or only traces thereof are formed, while at the same time the period of fermentation becomes considerably shorter than previously. In general, the method of the invention is carried out such that the mycelium is agglomerated into pellets before being introduced into the main substratum, and at some time after the introduction of the pellets the pH of the main substratum is reduced substantially by addition of an acid. The active mycelium aggregate obtained in this manner will rapidly begin to convert the sugar into citric acid without formation of oxalic acid or the like.

According to one embodiment of the invention, the formation of pellets is carried out in a special way while agitating mechanically and blowing in air. The highly active mycelium aggregates thus obtained acclimatize themselves easily in the main substratum to form pure citric acid. For production on an industrial scale, certain dimensions of the pellet forming apparatus have proved preferable. Also the manner of agitation and aeration seems to be of decisive importance to the quality of the pellets.

The formation of mycelium aggregates as well as the fermentation and conversion proper are carried out in using beet sugar molasses as substratum. However, the method may also be applied when using other types of molasses, such as cane sugar molasses, for instance, although the yield will become lower because of the presence of certain fermentation retarding substances or the lack of special nutritive substances. The yields may be considerably improved by adding nutritive substances such as amino acids obtained from natural products. When using beet molasses it is also possible to admix other molasses, low machine syrup or other unrefined products remaining from the sugar production. However, the invention is primarily concerned with the use of beet molasses as this material has proved to be specifically suitable for the method.

The aggregation of the mycelium is preferably carried out in a beet molasses containing substratum of the same type as the one used for the fermentation of citric acid, possibly with a lower concentration of sugar than that of the main substratum. For instance, the sugar content may amount to 5–15%. Excellent results have been obtained with a sugar content of 6–7.5% in the solution used for the preparation of pellets and with 15% sugar in the main fermentation solution. As in the case of the main substratum, potassium ferrocyanide is added to the preparatory substratum for the purpose of suppressing, by means of complex formation, any detrimental effect of metal ions, particularly iron, and to prevent a too rapid growth of the mycelium. Besides, nutritive salts, such as nitrogen and phosphorus salts may be added. The solution is sterilized in the customary manner, e.g. by heating, the ferrocyanide preferably being added before and the phosphate after the heating.

When preparing the substratum for the culture of pellets, it is suitable to use common ground-water or tap-water filling the normal requirements. Owing to its content of salts etc., such water is generally more suitable than distilled water (condensate of steam) or deionized water. However, the pH of the substratum should be adjusted to the range of 5.5–5.9 which is the most suitable one for the aggregation.

The aggregation may be carried out in the known manner by shaking but is preferably performed by mechanical agitation in combination with supply of dispersed air. To obtain pellets having a mechanically stable structure and a high activity an effective air supply is necessary. The air should be dispersed so as to obtain a uniform growth in all parts of the vessel. An amount of air of 3 to 40 liters per liter of substratum an hour may be used and in most cases an amount of 5 to 10 liters per liter of substratum an hour is suitable. A reduction of the amount of air to 2 liters or less per hour and liter of substratum results in pellets with a loose structure and of a poorer quality.

It is of importance to maintain a suitable turbulence in the aggregation vessel so that the mycelium threads (hyphae) are twined into spherical aggregates resembling small balls of thread. At a low speed of the agitator each aggregate will contain a relatively greater number of developed spores than at a higher speed. The agitation must not be too strong, because an excessive turbulence does not give the desired aggregation but only a pulpy mass. The number of spores added should preferably be of the magnitude of $10^{10}$ per liter. Under the conditions stated the cultivation results in spherical aggregates having a diameter of generally .2 to .4 mm. and built up of hyphae or mycelium threads from, on an average, 500 to 600 spores.

The agitation in the aggregation vessel is preferably carried out by means of agitating arms mounted on one or more rotary shafts. The arms may be centrically or eccentrically disposed and the shafts may be vertical, horizontal or inclined. Stationary members or brake arms are preferably provided between the agitator arms in order to create a turbulence promotive to the intertwining of the hyphae.

It has been found advantageous to adjust the peripheral speed of the agitator means and the width of the agitator arms such that the product thereof lies within 110 to 170 square centimeter per second or, preferably, at about 140 square centimeters per second. In case the agitator arms are inclined in the plane of rotation their width is calculated along the projection in the plane through the agitator shaft and its respective arms. This relation applies to ordinary agitators of this type or to ordinary distances between the brake arms or other braking means and the rotary arms, i.e. up to distance of 2–3 times the width of the rotary arm.

Preferably the aggregation should not be carried out in too large vessels or in vessels with too great diameter, because the turbulence becomes insufficient near the agitator shaft, if long agitator arms are driven at such a limited peripheral speed that their outer ends do not cause shattering of the pellets. Cylindrical vessels with a vertical agitator shaft and agitator arms having a length not exceeding 1 meter are to be preferred.

The development of the hyphae and the aggregation respectively will generally require a period of time of 9 to 25 hr. at the temperature optimal for the development of the spores, i.e. about 27 to 30° C.

The sterile main substratum having a temperature of about 30° C., a sugar content of preferably about 15% and a pH adjusted at almost neutral values or preferably within the range of 7.5 to 5.5 is then inoculated with an accurately calculated amount of pellets while blowing in air or possibly air containing additional oxygen. A suitable quantity is 3 to 7 liters of air per liter of substratum an hour. The substratum is aerated in this manner for a number of hours so as to acclimatize the pellets and to start a formation of citric acid. During this period, the enzymatic activity is rather insignificant and only slightly exothermic, and therefore it might be necessary, in a temperate climate, to supply some heat so as to keep the temperature at the value most favourable to the biological processes, i.e. 29.5 to 29.8° C.

After a period of time, when, due to formation of citric acid, the pH value of the substratum has been reduced to about 5.5–4.5, i.e. generally after 4 to 48 hours, acid (hydrochloric acid) is added to further reduce the pH of the substratum to a value below 3.5, preferably 3.0 or slightly thereunder. In connection with the addition of acid the pressure of oxygen in the solution is increased by blowing in dispersed oxygen, air enriched with oxygen or air of at least two atm. gauge. Now, the formation of citric acid begins in earnest and considerable amounts of heat must be removed from the substratum during the next few days by means of cooling. Towards the end of the fermentation the oxygen pressure in the substratum may be reduced, e.g. by blowing in air at atmospheric pressure.

To reduce the costs for oxygen, it may be suitable to recirculate the oxygen for renewed use. However, the proportion of carbonic acid therein should not be permitted to be too high, as the fermentation would be obstructed thereby. The concentration of carbonic acid in the circulating gas can be kept at a permissible value by absorption in a known manner.

If air enriched with oxygen is used instead of oxygen, it might be suitable to carry out the process at superatmospheric pressure or to use high fermentation vessels. Of course this applies also when using air only. The air, the oxygen or the air enriched with oxygen is preferably introduced at the bottom of the fermentation vessel or through the arms of an agitator or in both these ways and is dispersed by means of porous plates, perforations or the like.

The invention will be further described below by way of some examples which, however, must not be regarded as involving any limitation.

*Example 1*

The process is carried out in a cylindrical vessel having a volume of about 9 l. (diameter 190 mm., height 320 mm.). An agitator shaft provided centrally within said vessel carries three agitator arms (length 150 mm., width 25 mm.) equally spaced. Brake arms of a width of 25 mm. extend diametrically across the vessel between the agitator arms.

A normal substratum having a sugar content of 6.0–7.5% and a pH of about 5.7–5.9 was made up of beet sugar molasses. About .3% potassium ferrocyanide and about .2% potassium dihydrogen phosphate were added thereto, and inoculation took place with spores of *Aspergillus niger*. The spores were added in a number of about $10^{10}$ per liter solution. The liquid was maintained at 30° C. The agitator was rotated at 70 r.p.m. and 5 l. dispersed air per l. substratum an hour were supplied. After 12 hours about $1.5 \times 10^8$ pellets with excellent structure and a diameter of .2 to .4 mm. were obtained.

The main fermentation was carried out in a cylindrical vessel dimensioned to receive liquid within a space of .6 m. diameter and 3.5 m. height and to leave a further space above the liquid for housing foam possibly formed. About 1000 l. diluted and sterilized beet sugar molasses were introduced in said vessel. This mash was of the same type as the one used for the production of pellets, i.e. ferrocyanide and phosphate were added thereto, but the sugar content was about 15% and pH 6.8. The mash was maintained at a temperature of about 30° C. and dispersed air was supplied in an amount of about 3 l. per l. mash an hour through spargers provided in the bottom of the vessel. The pellets prepared as above (a total number of about $1.5 \times 10^8$) were added so that the mash contained about $1.5 \times 10^5$ pellets per liter. The aeration was continued for 40–48 hours at a temperature of 29.5 to 29.8° C. Some citric acid was formed during this time and caused a reduction of the pH to 4.7. Instead of air, 5 l. oxygen per l. mash an hour were now supplied and hydrochloric acid was added until pH had sunk to 3.0. The mash was cooled to maintain the temperature at the values indicated, and the fermentation was completed in 96 hours. The oxygen was withdrawn at the top of the fermentation vessel, and after washing with alkali it was reintroduced at the bottom of the vessel. Fresh oxygen was supplied in an amount corresponding to the quantity consumed.

The completely fermented mash contained about 15% of citric acid. It was clear and could easily be separated from the pellets by filtration. Practically all the sugar was used up and the yield of citric acid was high, i.e. 90 to 100 g. citric acid per 100 g. sugar. The solution was free from oxalic acid, and the citric acid was recovered therefrom in the known way.

The number of revolutions of the agitator, the amount of air supplied and the time of treatment when preparing the pellets may be varied within certain limits. If the supply of air is reduced to 2 l. per l. substratum an hour, the pellets will get a more loose structure, a lower activity and less capability to adapt themselves to an acid medium. An increase of the number of revolutions to 140 r.p.m. with aeration only by diffusion from the liquid surface also gave pellets of poor quality. A further increase of the number of revolutions resulted in a decreased formation of pellets as well as an increased shattering of pellets already formed. An increase of the amount of air to 7 l. per l. substratum an hour at a number of revolutions of 70 r.p.m. of the agitator gave very uniform and stable pellets in such a short time as 9 hours. These pellets showed a high activity as well as adaptability to an acid medium.

*Example 2*

The pellets were produced in a cylindrical vessel of about 220 l. volume (diameter 520 mm., height 1040 mm.). An agitator disposed centrally within the vessel was provided with six straight agitator arms (length 450 mm., width 40 mm.) equally spaced. Brake arms having a width of 40 mm. were mounted to extend diametrically in the vessel between the agitator arms. Dispersed air could be supplied through ceramic filters provided in the bottom of the vessel. It was ascertained that structurally very good pellets with high activity and very good adaptability to an acid medium could be obtained at an agitator speed of 15 r.p.m. and an air supply of about 5 l. per l. substratum an hour, the other conditions being similar to those of the preceding example. An increase of the number of revolutions resulted in pellets of a smaller diameter, and a reduction of the aeration gave a poor activity.

The amount of pellets thus obtained was sufficient for a fermentation vessel taking a liquid volume of 15 to 25 cub. m., e.g. a diameter of 2.25 m. and a height of 5 m. The main fermentation in this vessel was carried out during supply of air or oxygen through stationary porous spargers or the like at the bottom of the vessel. The spargers were placed centrally at the bottom so that a rising flow of air and liquid was obtained in the central portion of the vessel. To improve the circulation of liquid and pellets the vessel could be provided with guide surfaces, for instance in the form of a cylinder of sheet metal (diameter 1.85 m., height 3.0 m.) open at both ends and disposed centrally at about 500 mm. distance from the bottom.

On completion of the fermentation in the manner described in the preceding example the substratum was almost free from sugar after 85 to 90 hours.

*Example 3*

Instead of arranging fixed, porous spargers or the like for the aeration as in the Examples 1–2, the gas can be supplied through perforations in one or more of the agitator arms, said perforations communicating with channels through said arms and through the agitator shaft. The number of revolutions is so adjusted that the pellets are not shattered. Also in this case it may be advantageous to provide guide surfaces, e.g. in the form of a cylinder, to obtain a definite circulation in the vessel.

*Example 4*

Generally it is suitable to prepare pellets in a vessel of such volume that a batch sufficient for inoculation in one or several fermentation vessels is obtained. This has the advantage that in each separate fermentation vessel the pellets are of a uniform type and/or are in the same stage of development. In the case of very large fermentation vessels, e.g. of 200 cub. m. substratum, it is thus to prefer to use a pellet preparation vessel of about 2 cub. m. volume. Such a vessel may have a diameter of 1000 mm. and a height of 2500 mm., and its agitator means may comprise ten spaced agitator arms (length 900 mm., width 45 mm.) and nine intermediate brake arms (width 45 mm.). The speed of the agitator arms may be 7.5 r.p.m.

A fermentation vessel of the size mentioned above (about 200 cub. m.) may be designed as a cylindrical tower of 3 m. diameter and 28 m. height. Instead of blowing in oxygen during the main period of fermentation, dispersed air with an addition of about 10% oxygen is introduced and escapes at the top of the tower. By putting the tower under super-atmospheric pressure the time of fermentation can be reduced within certain limits. At a sufficient superatmospheric pressure the addition of oxygen may be omitted. Also in this case it may be advisable to provide guide surfaces in order to obtain a definite circulation.

What I claim is:

A method of producing citric acid from diluted solutions consisting essentially of beet sugar molasses by submerged fermentation with mycelium of citric acid producing *Aspergillus niger*, said method comprising: preparing said mycelium substantially in the form of pellets in a preparatory step, adding said pellets to a substantially neutral solution consisting essentially of the beet sugar molasses, permitting the pellets to be acclimatized over a period of time, in which the pH of the solution drops to a value between about 5.5 and 4.5 due to formation of citric acid, thereafter adding hydrochloric acid to reduce the pH of said solution to a value below about 3.0 to prevent the formation of oxalic acid, and carrying out the fermentation while supplying gases rich in oxygen at a pressure resulting in an increased pressure of oxygen in the solution.

References Cited in the file of this patent

UNITED STATES PATENTS

| | | |
|---|---|---|
| 2,400,143 | Waksman | May 14, 1946 |
| 2,739,923 | Martin | Mar. 27, 1956 |
| 2,883,329 | Niquet et al. | June 27, 1959 |
| 2,910,409 | Fried et al. | Oct. 27, 1959 |

FOREIGN PATENTS

Industrial Microbiology, third edition, 1959, pp. 551–552; 557–561.